(12) United States Patent
Figner et al.

(10) Patent No.: US 8,875,975 B2
(45) Date of Patent: Nov. 4, 2014

(54) DEVICE FOR FRICTION STIR WELDING WITH A TENSION ROD

(75) Inventors: Gunter Figner, Graz (AT); Gunter Figner, Graz (AT)

(73) Assignee: Stirzone OG, Graz (AT)

( * ) Notice: Subject to any disclaimer, the term of this patent is extended or adjusted under 35 U.S.C. 154(b) by 77 days.

(21) Appl. No.: 13/816,399

(22) PCT Filed: Aug. 10, 2011

(86) PCT No.: PCT/AT2011/000340
§ 371 (c)(1),
(2), (4) Date: Mar. 21, 2013

(87) PCT Pub. No.: WO2012/019210
PCT Pub. Date: Feb. 16, 2012

(65) Prior Publication Data
US 2013/0168436 A1 Jul. 4, 2013

(30) Foreign Application Priority Data
Aug. 11, 2010 (AT) .................................... 1347/2010

(51) Int. Cl.
*B23K 1/06* (2006.01)
*B23K 20/12* (2006.01)
*B23K 37/02* (2006.01)

(52) U.S. Cl.
CPC ............... *B23K 20/12* (2013.01); *B23K 20/126* (2013.01); *B23K 37/0217* (2013.01)
USPC ........................................................ 228/1.1

(58) Field of Classification Search
CPC ......................... B23K 20/126; B23K 20/1255
USPC ................................................ 228/112.1, 1.1
See application file for complete search history.

(56) References Cited

U.S. PATENT DOCUMENTS

| | | | | |
|---|---|---|---|---|
| 3,391,267 A * | 7/1968 | Rudd | ............................ | 219/102 |
| 3,870,853 A * | 3/1975 | Reinhardt et al. | ....... | 219/124.31 |
| 5,794,835 A * | 8/1998 | Colligan et al. | ............... | 228/2.1 |
| 6,199,745 B1 * | 3/2001 | Campbell et al. | .......... | 228/112.1 |
| 6,311,889 B1 * | 11/2001 | Ezumi et al. | ............... | 228/112.1 |
| 6,719,184 B2 * | 4/2004 | Ishida et al. | ............... | 228/112.1 |
| 6,997,369 B2 * | 2/2006 | Hamada et al. | ............ | 228/112.1 |
| 8,079,507 B2 * | 12/2011 | Matlack et al. | ............ | 228/112.1 |
| 2004/0234352 A1 * | 11/2004 | Vanderpol et al. | ............ | 409/178 |
| 2007/0266536 A1 * | 11/2007 | Burton et al. | ................... | 29/428 |
| 2008/0096038 A1 * | 4/2008 | Nagano | ......................... | 428/586 |
| 2010/0006622 A1 * | 1/2010 | Smith et al. | .................... | 228/2.1 |
| 2013/0119115 A1 * | 5/2013 | Kato et al. | ................. | 228/112.1 |

* cited by examiner

*Primary Examiner* — Devang R Patel
*Assistant Examiner* — Carlos Gamino
(74) *Attorney, Agent, or Firm* — Sutherland Asbill & Brennan LLP

(57) ABSTRACT

The invention relates to a device for producing a weld seam on work pieces by means of friction stir welding, said device having a welding head (5) with a rotating friction stir welding tool (4), the welding head being guided along the joining region and supported with respect to the work piece (1). In said device an irrecoverable tension rod (3) is provided for support, said rod being able to penetrate the welding region, being supported with its lower end on the work piece (1) in a tensioned manner, and carrying a rail (3*b*) on its upper end for supporting a counter piece (6) that is mechanically connected to the welding head (5) or to the friction stir welding tool (4). An additional supplementary tool (9) working, when seen in the direction of welding, in front of the friction stir welding tool (4) is provided for removing the upper section (3*e*) of the tension rod protruding above the welding plane from the welding region.

10 Claims, 4 Drawing Sheets

DEVICE FOR FRICTION STIR WELDING WITH A TENSION ROD

CROSS-REFERENCE TO RELATED APPLICATIONS

This application is the national stage of International Application No. PCT/AT2011/00340, filed Aug. 10, 2011, and claims priority benefit of Austrian Patent Application No. A 1347/2010, filed Aug. 11, 2010. These applications are incorporated by reference herein.

The invention relates to a device for producing a weld seam on work pieces by means of friction stir welding, said device having a welding head with a rotating friction stir welding tool which is guided alone the joining region and supported with respect to the work piece.

Due to the high process forces, friction stir welding requires a corresponding stable dimensioning of the welding installation, and the process forces have to be absorbed by the system for clamping of the parts to be welded or of the work piece. An expensive clamping technique that often takes up a large amount of space is required for that reason, wherein the problems increase with the size of the work pieces, and often broad portals for guiding and supporting the welding tool with its welding head are required.

Moreover, in the case of an imprecise process management caused by deviations from the position between the friction stir welding tool and the work piece, pores or bonding defects in the weld seam occur. Usually, a support plate is used to support the high forces; however, this can lead to damage to the friction stir welding tool in the case of imprecise process management. In addition, the friction stir welding tool has to be moved precisely along the joint gap, wherein deviations normal to the movement of advance lead to losses in seam quality.

In friction stir welding, usually no additional material is used in the process technique, so that it is also not possible to influence the alloy composition of the seam using an additional material.

One problem of the invention consists of the elimination or at least the reduction of the above-mentioned disadvantages of the devices of the prior art.

This problem is solved by a device of the type mentioned at the start, in which, according to the invention, for support, an irrecoverable tension rod is provided, which is supported with its lower end on the tool in a tensioning manner, and which carries a rail on its upper end for supporting a counter piece that is mechanically connected to the welding head or tool, wherein an additional supplementary tool is provided, which works, when viewed in the direction of welding, in front of the welding head, for removing the upper section of the tension rod protruding above the welding plane from the welding region.

By means of the invention, most of the forces that occur are absorbed directly by the tension rod, which makes it possible for the device and the associated clamping systems to be of small design size. Due to the use of the irrecoverable tension rod, root defects of and damage to the welding head can be prevented, because the stirring or welding process can be carried out downward into the end region of the tension rod. Since the tension rod with its rail is used at the same time as guide, no seam tracking systems are needed in order to prevent deviations in the position of the welding head parallel to the plane of the metal plate and normal to the seam direction.

If, in connection with the invention, mention is made of a work piece, it should be clear that this term covers both two separate parts, for example, plates, that are to be connected to each other, and also a single-piece part on which a weld seam, for example, a longitudinal or peripheral seam on a pipe, is to be produced.

The use of the terms "upper" and "lower" should also not be understood to be limiting, because top and bottom here refer to a preferred, but not obligatory, position of the tension rod or of the other parts as represented in the drawing.

In some cases, it can be advantageous if the tension rod is divided along a plane extending in the direction of advance of the tool.

If the two portions of the tension rod are designed here to form a single piece with the work piece portions to be welded, the insertion of the tension rod prior to the welding can be dispensed with.

In an additional advantageous embodiment it is possible to provide that the tension rod passes through the welding region. Since the lower portion of the tension rod remains in the work piece, its material is stirred in, so that the possibility is opened up for using another material for the tension rod different from the material of which the work piece consists, and the mechanical/physical properties of the weld seam can be influenced in this manner.

An embodiment which is suitable not lastly because of its symmetry properties is characterized in that the tension rod is substantially in the shape of a double T.

With a view to the required movement between the rail and counter piece, another useful embodiment is provided in which the counter piece comprises at least one freely rotating roller.

The partial or complete cutting of the upper portion of the tension rod can be carried out particularly efficiently if the supplementary tool is a rotating milling tool. Here, it is advantageous particularly if the rotating milling tool is arranged coaxially with respect to the welding head.

However, the supplementary tool can also be a saw, which is advisable particularly if the upper section of the tension rod is to be cut off and then moved out of the welding region.

The invention and further advantages thereof are explained in greater detail below, in reference to the drawing.

Figure 1:
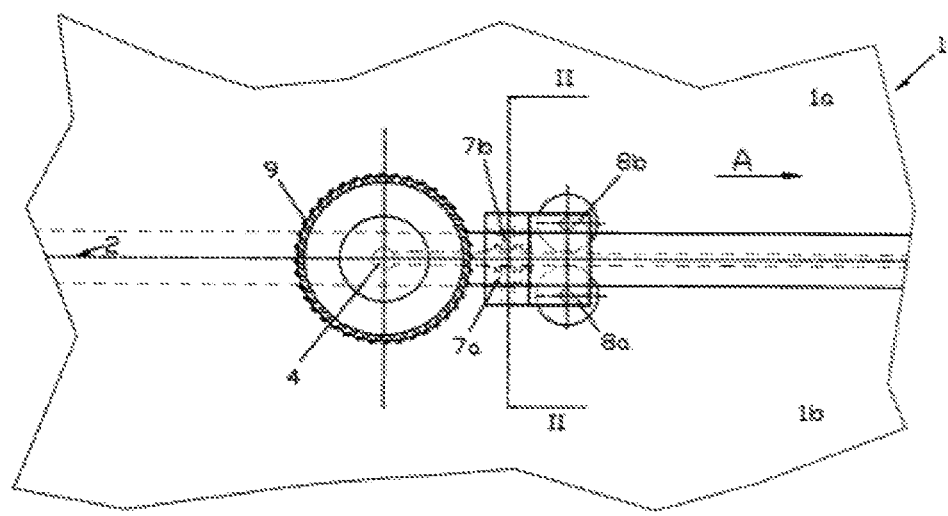
FIG. 1 shows a sectional top view along line I-I of FIG. 3.
Figure 2:
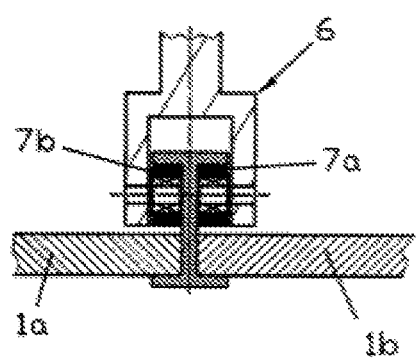
FIG. 2 shows a cross section along line II-II of FIG. 1.
Figure 3:
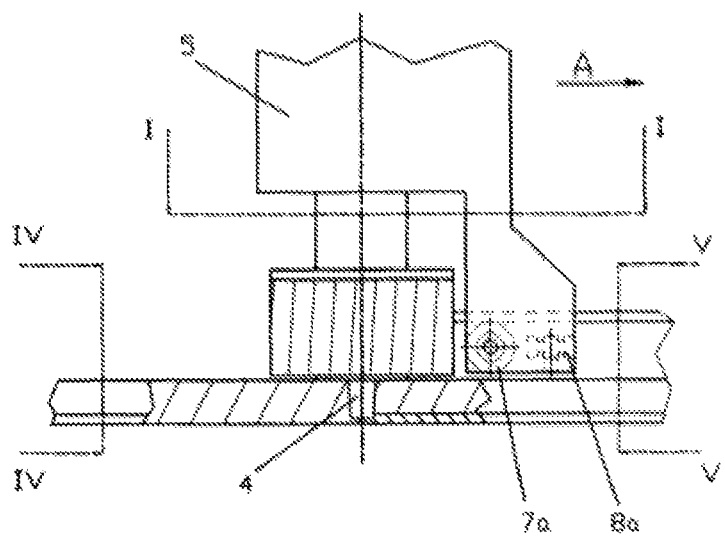
Figure 4:
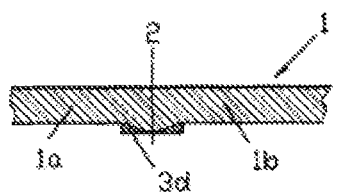
Figure 5:
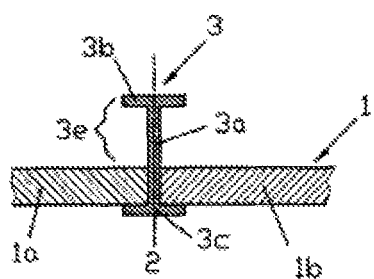
Figure 6A:
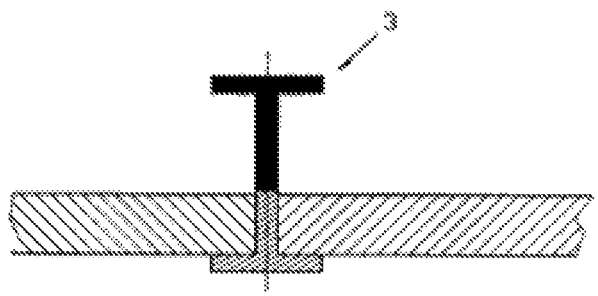
Figure 6B:
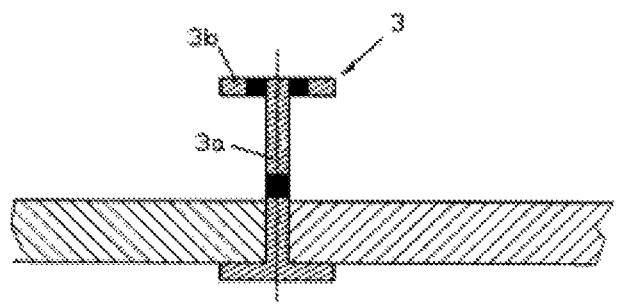
Figure 6C:
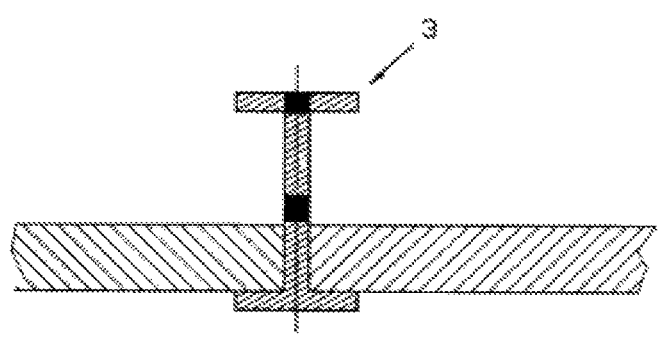

FIG. 3 shows a side view of a portion of the device according to FIG. 1, in a partial cross section, FIG. 4 shows a detail in cross section along line IV-IV of FIG. 3, FIG. 5 shows a detail of the device in cross section along V-V of FIG. 3, FIGS. 6a, 6b and 6c show in detail and in cross section different variants of the cutting of the upper portion of the tension rod, and FIGS. 7a to 7d show in cross sections, as in FIGS. 6a to 6c, different embodiments of the tension rod.

First, in reference to FIGS. 1 to 5, an embodiment of a device according to the invention is explained, wherein it is assumed that the person skilled in the art is familiar with the devices or apparatuses for friction stir welding and in general with the friction stir welding process. Therefore, only those parts of the device needed for understanding the invention are explained and shown.

A work piece 1, on which a weld seam 2 is to be produced, which is indicated here by its centerline, consists in the present case of two work piece portions 1a, 1b, in the present case the plates 1a and 1b. The plates are clamped in and held, for example, on a corresponding support which is not shown here, for example, a worktable, wherein a tension rod 3 is inserted in a gap between the end faces of the work piece portions or plates 1a and 1b. This tension rod 3 in the present embodiment example is designed in the shape of a double T, and it has a bar which is vertical in the drawing, with a head portion 3b and a foot portion 3c (see FIG. 5). The work piece 1 and the tension rod 3 can be made of the same material or of different materials, in particular of metals, for which the method of friction stir welding is suitable, such as, for example, aluminum, magnesium and their alloys, or steel, iron alloys, etc.

It should be mentioned that in the depicted example, two plates 1a, 1b are indeed connected to each other; however, the ends to be connected can also be the ends of a single-piece work piece, including, for example, the ends of a blank that have been bent together to form a pipe. It is also not necessarily for the weld seam 2 to extend in a straight line, rather, curved weld seams are also possible, which naturally presupposes a corresponding curvature of the tension rod 3. The device according to the invention has a welding head 5 with a known friction stir welding tool 4, which is set in rotation by a drive unit that is not shown, and which in general has a rotating pin which protrudes from a cylindrical shoulder. The rotating friction stir welding tool 4 is pressed by an appropriate mechanism against the welding region, wherein an additional drive unit, which is also not shown, ensures the advance in the direction of advance A.

The mentioned application force is relatively high and thus devices for clamping must be provided in general, in order to avoid, among other effects, a deformation of the work piece or damage to the friction stir welding tool. The invention now provides, as essential means of support, the tension rod 3 whose head portion 3b is also used as a rail for supporting a counter piece 6, which is mechanically connected to the welding head 5 or to the friction stir welding tool 4. In the embodiment shown, this counter piece 6 has two horizontally mounted rollers 7a, 7b, which are mounted so they rotate freely on the fork-shaped end of the counter piece 6, and which are supported in the manner that can be seen in FIG. 2 on the inner side of the rail or of the head portion 3b on both sides. In addition, as indicated in FIG. 1, it is also possible for two vertically mounted rollers 8a, 8b to be rotatably arranged on the counter piece 6, which are located, viewed in the direction of advance A, in front of the horizontally mounted rollers 7a, b, and supported on the vertical bar 3a of the tension rod 3.

The tension rod 3 is referred to as an irrecoverable tension rod in the context of the invention, because it is no longer present after the preparation of the seam, at least in its original form. The tension rod 3 should only be used as a temporary support of the tool 4 or of the welding head 5, and therefore its upper section, that is to say the section of the tension rod 3 that protrudes over the work piece, must be separated or removed before the weld head 5 has reached the corresponding place. For this purpose, an additional tool 9 is provided.

To the extent that the tension rod 3 is not designed to form a single piece with the work piece 1, which is explained below in reference to an example, it is supported with a broadened foot portion 3c on or under the work piece.

In the present example, the supplementary tool 9 for traction is designed as a milling tool rotating about a horizontal axis, which can rotate coaxially with respect to the friction stir welding tool 4. As can be seen in FIGS. 1 and 3, during the advance of the welding head 5 and of the milling tool 9 in the direction of advance A, shortly before the region of use of the friction stir welding tool 4, the entire top portion of the tension rod 3e is cut by the milling tool, and the friction stir welding tool 4 as a result welds by stirring not only the two plates 1a and 1b together, but it also includes, in the welding process, the portion of the tension rod 3 that remains between the two plates 1a and 1b, in particular the vertical bar 3a and optionally also the foot portion 3c.

Reference is made in particular again to FIGS. 5 and 4, wherein FIG. 5 shows the welding region of the work piece 1 before the machining with the device according to the invention, and FIG. 4 shows this region after machining, i.e., the cutting of the tension rod 3 and the welding of the two plates 1a and 1b. As can be seen in FIG. 4, only a slight remainder 3d of the original tension rod 3 is present in the depicted example.

The above-described embodiment with the coaxial milling head or milling tool 9, which can optionally also be driven separately from the welding head 5, is advantageous in many cases; however, another form of the milling tool can also be used, for example, a milling tool of smaller diameter, which is entirely arranged in front of the welding head 5, for cutting the upper section of the tension rod 3.

The tension rod 3 is used first to absorb the forces substantially directly, as desired, without large detours through the work piece or the clamping devices; however, it is also used to guide the tool 4 and its welding head 5 as well as the milling tool 9, namely in particular over the vertically mounted rollers 8a, b, but also over the horizontally mounted rollers 7a, b, so that special seam tracking systems can be dispensed with, which are required in the known devices. Although the rollers are useful for supporting and guiding, the supporting and guiding can also be carried out by unguided sliding pieces that are lubricated during the welding process.

In reference to FIGS. 6a to 6c, it is shown that, according to FIG. 6a and as described above, the entire upper section of the tension rod 3 can be cut, which is shown in FIG. 6 by blackening. On the other hand, it is also possible to carry out the cutting only in sections, wherein in FIG. 6b, on the one hand, the head portion 3b of the bar 3a, and, on the other hand, the bar 3a as well can be separated from the lower section of the tension rod 3. For this purpose, it is possible to provide appropriately designed, and also more complex, milling tools or saws.

Another form of the upper portion of the tension rod is shown in FIG. 6c. Here, the bar is divided in the center into a horizontal and two additional vertical bars. The upper portion of the profile in this case is in the form of a "U." The horizontal bar of the "U" is cut by the supplementary tool 9.

If an incomplete cutting according to FIG. 6b c is carried out, the remaining portions of the tension rod 3 extending over the entire welding region are preferably moved past on the side or bent away, during the welding and the advance.

It should be noted here that the supplementary tool, depending on the material and the dimensions of the extension rod, can also be of another appropriate type, and that it is not limited to carrying out a cutting process. In this way, it is also possible to consider using laser beam cutting, or a cutting tool for cutting, chamfering or punching can be used.

Figure 7A:
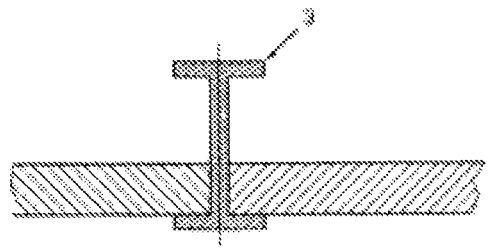
Figure 7B:
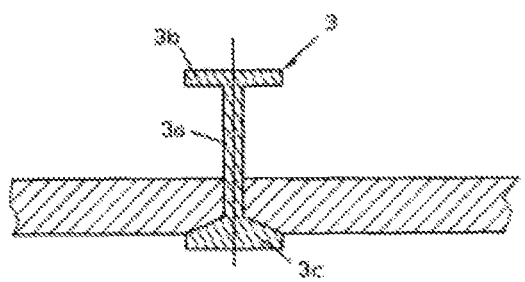
Figure 7C:
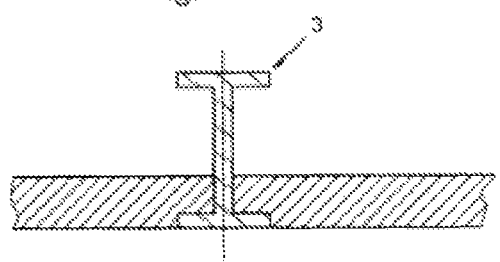
Figure 7D:
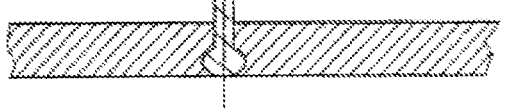

Variants of the tension rod design in the area of a "double T" are shown in FIGS. 7a to 7c, wherein FIG. 7a shows the design already known from FIG. 5; however, the lower portion of the tension rod is integrated completely in the work piece 1. FIG. 7b shows a design in which the foot portion 3c is located in part in the work piece 1, and is configured conically toward the top, and at the same time is received partially or completely in the work piece 1 or between the two plates 1a, 1b.

The designs according to FIG. 7a, b can in some cases be desirable, in particular in order not to interfere with the appearance of the bottom side of the work piece 1, but they require a corresponding machining of the ends of the work piece 1 that are to be connected to each other. It is also possible to provide the upper portion of the tension rod already with the metal plates to be welded (FIG. 7c).

Moreover, in some cases, it can be helpful to design the tension rod so it can be divided along a plane σ extending in the direction of advance of the tool, in general the plane of symmetry of the tension rod 3, see FIGS. 6c, 7a, 7c, for example.

Although the drawings of the tension rod 3 are represented symmetrically, such a design is not absolutely required. It is essential that the head portion 3b of the tension rod 3, which is used as a rail, can thus work together with the counter piece 6 in such a manner that it absorbs the occurring tensile forces and optionally also takes over the guiding function.

The invention claimed is:

1. A device for producing a weld seam on a work piece by means of friction stir welding, said device comprising:
    a welding head with a rotating friction stir welding tool which is guided along a welding region and supported with respect to the work piece, characterized in that, for support, an irrecoverable tension rod is provided, wherein the tension rod has a lower end supporting the work piece in a tensioned manner, and wherein the tension rod has an upper end section which comprises a rail for supporting a counter piece that is mechanically connected to the welding head,
    wherein a supplementary tool is provided, which works, when viewed in a direction of welding, in front of the friction stir welding tool, for removing the upper end section of the tension rod protruding above a surface of the work piece in the welding region.

2. The device of claim 1, characterized in that the tension rod is symmetrical about a vertical plane (σ) extending in the direction of advance of the tool.

3. The device of claim 2, characterized in that at least a portion of the tension rod is designed to form a single piece with the work piece to be welded.

4. The device of claim 1, characterized in that the tension rod passes through the welding region.

5. The device of claim 1, characterized in that the tension rod has a lower end section, which has a broadened foot portion.

6. The device of claim 1, characterized in that the tension rod is substantially in a shape of a double T.

7. The device of claim 1, characterized in that the counter piece has at least one freely rotating roller.

8. The device of claim 1, characterized in that the supplementary tool is a rotating milling tool.

9. The device of claim 8, characterized in that the rotating milling tool is arranged coaxially with respect to the welding head.

10. The device of claim 1, characterized in that the supplementary tool is a saw.

* * * * *